United States Patent

[11] 3,555,238

[72] Inventors  Elliott J. Fay
  Willingboro;
  Ralph K. Ritter, Moorestown, N.J.
[21] Appl. No. 633,844
[22] Filed Apr. 26, 1967
[45] Patented Jan. 12, 1971
[73] Assignee Omark Industries, Inc.
  Portland, Oreg.
  a corporation of Oregon

[54] PERMANENT ARC SHIELD
  6 Claims, 3 Drawing Figs.
[52] U.S. Cl. .................................................. 219/98,
  219/127
[51] Int. Cl. ................................................... B23k 9/20
[50] Field of Search .......................................... 219/98, 99,
  127, 130; 252/516, 518

[56] References Cited
  UNITED STATES PATENTS
  2,761,957  9/1956  Sholle ........................... 219/98(X)
  3,236,663  2/1966  Grulke et al. .................. 252/516(X)
  3,277,269  10/1966  Zeller ............................ 219/127
  3,291,958  12/1966  Glorioso ........................ 219/98
  3,396,263  8/1968  Even et al. ..................... 219/127
  3,408,472  10/1968  Spisak .......................... 219/98

Primary Examiner—A. Bartis
Assistant Examiner—R. E. O'Neill
Attorney—Charles F. Duffield ABSTRACT: Permanent arc shields, both internal and external, together with attachments associated therewith for use in conjunction with electrical arc welding apparatus suitable for welding studs and spuds to a workpiece. The external permanent arc shield is used externally of the member being welded and is secured to the welding apparatus by means of an arc shield attachment or cooling jacket and includes a peripheral molding chamber in one end thereof which is disposed around the member being welded to provide a shield and mold. The internal arc shield is adapted for use in welding spuds to a workpiece, and is disposed interiorly of the spud to provide an internal molding chamber therein. The permanent arc shields are of a composition such that they may be used for repeated welds. They may be formed of boron nitride material and/or force cooled.

PERMANENT ARC SHIELD

BACKGROUND OF INVENTION

In stud welding, a metallic stud member is welded to a metallic body member such as a plate. This operation is ordinarily performed by means of equipment which includes in addition to a source of electrical energy and suitable timing controls, a welding gun which holds and manipulates the stud throughout the welding cycle.

In a typical arc welding cycle performed with an arc welding tool, a stud is first pressed against the workpiece to place it in good electrical contact therewith and, upon initiation of the welding cycle, the stud is withdrawn from the workpiece while, simultaneously, a pilot arc is established between the stud and the workpiece. A main welding arc is then struck between the stud and the workpiece while the stud is retracted or at the beginning of its plunge toward the workpiece. The heat of the main welding arc forms small pools of molten metal on the end of the stud and on the surface of the workpiece at the point where the stud is to be affixed thereto.

The stud is plunged into the molten pool of metal with a relatively high force and high velocity to ensure a good weld between the two workpieces. The resultant impact of the stud with the workpiece has a tendency to spatter the molten metal outwardly from the point of contact of the stud with the workpiece. This spattering of metal makes it difficult to accurately and uniformly control the fillet of the weld metal formed between the stud and the surface of the workpiece and is, as well, hazardous and disconcerting to the operator. Further, the absence of a shield in the locus of the weld will allow too rapid cooling of the weld, all of which tends to degrade the quality of the weld.

In the past, the foregoing problems have been partially solved by the use of disposable arc shields which are well known in the art.

All such shields heretofore known were made of a composition that was destroyed after a single or relatively few welds, due to the heat and general environment of the stud welding process. Such disposable shields present an increased cost factor in the stud welding operation since a new shield must be used for each weld in addition to lost time incurred by reason of having to reposition a new shield each time another weld is to be made.

While stud welding has heretofore been commercially feasible by use of the disposable arc shields, spud welding by this process has not, until now, been commercially feasible. Spud welding is a form of welding in which the member to be welded comprises a hollow member or hollow stud which is generally cylindrical in configuration but which may be of any configuration and may as well, be threaded either externally or internally, or both. One of the greatest applications for spud welding is that of welding the spud over a hole in a vessel or conduit for the purpose of providing a fitting from the vessel through which fluid may pass.

A major problem inherent in spud welding is that the molten metal will flow into and partially close the hole over which the spud is being welded. Further, the absence of any control over the molten metal in the interior of the spud usually results in a weld of inferior quality.

SUMMARY OF INVENTION

The foregoing problems inherent in the use of disposable arc shields heretofore known are alleviated by the present invention in that the arc shield attachment and associated permanent arc shield of the present invention may be repeatedly used for a great number of welds.

Likewise, the problems inherent in spud welding are alleviated by the present invention in that the internal arc shield of this invention assures that the hole in the workpiece will remain free of molten metal and will, as well, control the molten metal in the region of the internal weld of the spud.

Accordingly, it is an object of this invention to provide an arc shield attachment or cooling attachment which is secured to the welding gun which supports a permanent arc shield formed of a material having high resistance to corrosion, erosion and extreme temperatures and of high thermal conductivity but being electrically nonconductive. In a specific embodiment of this arc shield, the material of which it is formed may be boron nitride.

It is a further object of this invention to provide a permanent arc shield of a suitable material which has an exterior surface thereof of a configuration so as to be in positive heat transfer relationship with the arc shield attachment with which it is associated in order to provide for maximum cooling of the arc shield. In one embodiment of the invention the arc shield may be of a tapered or conical configuration which is disposed in mating relationship with a corresponding configuration within the arc shield attachment.

It is a further object of the present invention to provide a permanent arc shield attachment which is water cooled to insure prolonged life of the associated permanent arc shield.

It is another object of the present invention to provide an internal arc shield for use in conjunction with welding of spuds to a workpiece which is formed of boron nitride material and which has a configuration corresponding to the interior of the spud but which is dimensioned to pass freely therethrough.

Other objects and advantages of the invention will be apparent from the following detailed description of a preferred embodiment thereof, taken in conjunction with the accompanying drawings in which.

DETAILED DESCRIPTION OF INVENTION

An arc shield, in order to be successful for repeated usage, must be of a material demonstrating high resistance to corrosion and extreme temperatures as well as a material demonstrating good thermal shock characteristics and high thermal conductivity. Additionally, such a material must be electrically nonconductive since the arc shield is operating in close proximity to the metallic member through which high current passes as the member is being welded. It is further necessary that the material of which the arc shield is formed be of a material having a resistance to wetting by molten metal in order to prevent the spattering metal from adhering to the surface thereof.

The applicants have discovered that the foregoing criteria for a permanent arc shield will be satisfactorily met by forming the arc shield from a material known as boron nitride. This material is capable of withstanding temperatures in excess of 5400° F. in an inert atmosphere and boron nitride demonstrates a very low degree of thermal expansion and accordingly, has a very good thermal shock resistance. Boron nitride is also electrically nonconductive but nevertheless demonstrates high thermal conductivity. Corrosive agents such as iron, aluminum, copper and zinc produce little effect on boron nitride, even at extreme temperatures.

Figure 1:
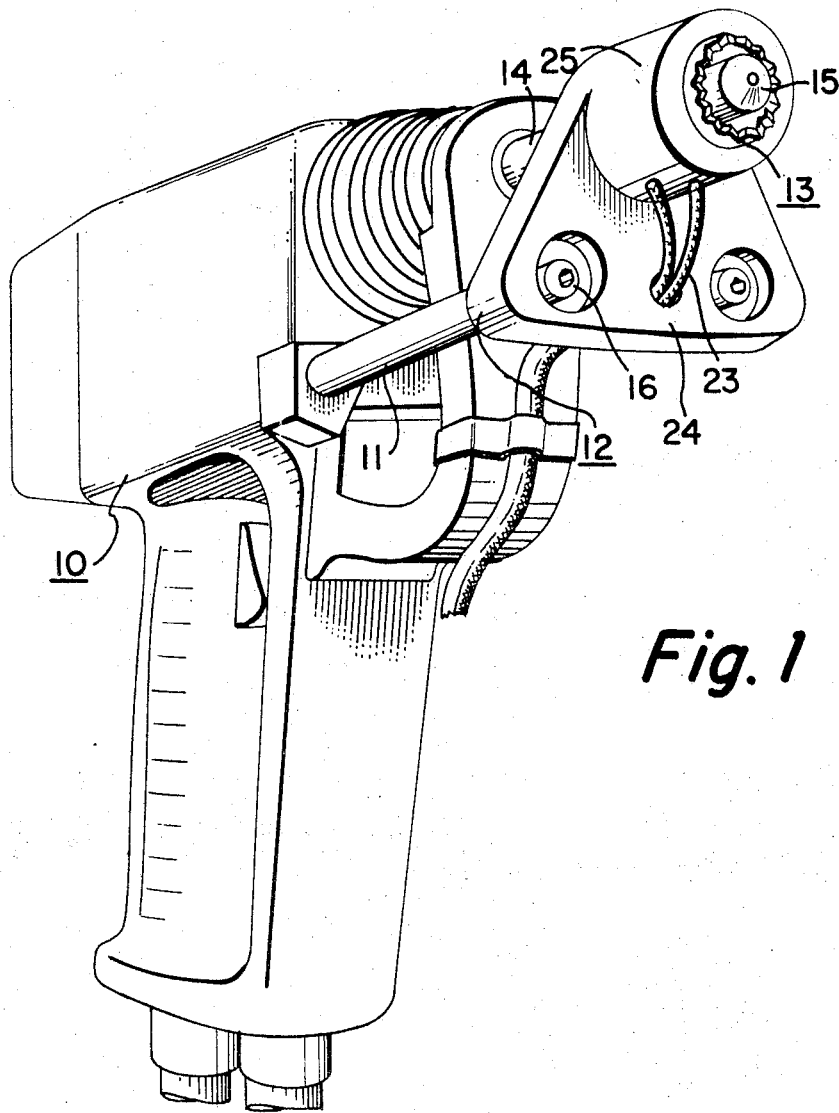
FIG. 1 is an isometric view of a stud welding gun including the arc shield attachment and permanent arc shield of the present invention as used for stud welding.

The embodiment of the permanent arc shield and its associated attachment of the present invention which is used for stud welding may be used in conjunction with any one of several types of welding guns presently available. One such type of welding gun may be that disclosed in application Ser. No. 381,991, filed July 13, 1964 now U.S. Pat. No. 3,445,619 which is generally depicted as 10 in FIG. 1.

A welding gun of this type employs two adjustable leg members 11 which support a conventional footpiece and arc shield holding device as is well known.

In one illustration of the present invention, the conventional footpiece and arc shield holder are replaced by the novel arc shield attachment or cooling jacket 12 and the permanent arc shield 13.

Figure 2:
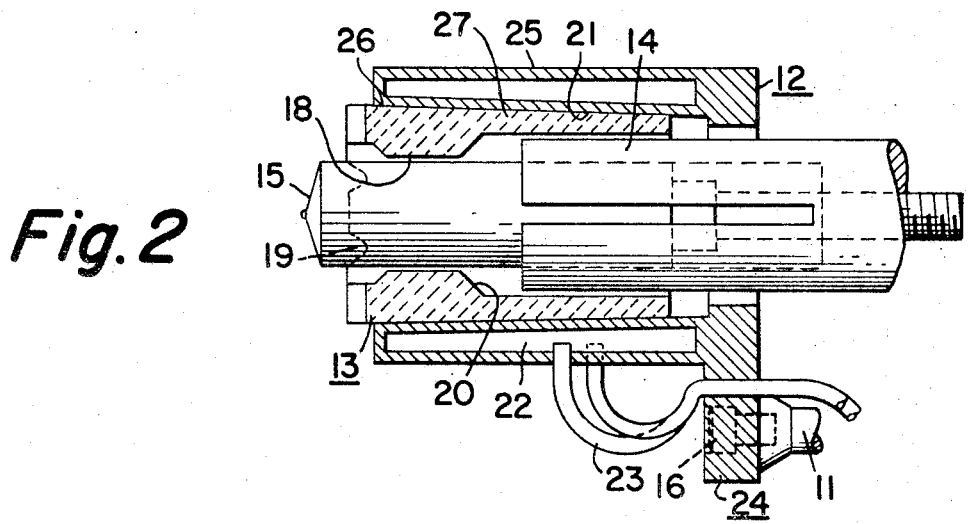
FIG. 2 is a side view, partially in section, of the arc shield attachment and permanent arc shield of FIG. 1.

The attachment 12, as better shown in FIG. 2, includes a lower flange portion 24 thereon which is secured to each of the spaced legs 11 by means of a suitable fastening means 16. Spaced above the flange portion 24 of the attachment 12 and formed integral therewith is a cylindrical member 25. The attachment 12 is so dimensioned that the axis of the cylindrical member 25 is concentric with the axis of the stud 15 and chuck or stud holder 14 of the stud welding gun in which the stud is disposed.

The permanent arc shield 13 includes a generally cylindrical front portion 26 thereof and a tapered or conical extended rear portion 27. The extended rear portion 27 of the arc shield 13 is secured to the attachment 12 by means of a corresponding conical configuration 21 on the inner circumference of the cylindrical member 25.

This mating relationship between the arc shield 13 and attachment 12 has been found to be most advantageous in that such an arrangement provides a positive heat transfer relationship between the attachment and the arc shield which enables the attachment to absorb and accordingly dissipate heat from the arc shield to thus prolong its life.

The forward end of the arc shield 13 includes a peripheral molding chamber formed by means of a counterbore in the end of the arc shield, one end of which further includes a small aperture 18 therein which is of a diameter slightly in excess of that of the stud which extends through the aperture during the welding operation.

This peripheral molding chamber further includes a plurality of slots 19 disposed in the wall of the arc shield to provide for controlled gas discharge from the region of the weld.

A reverse counterbore 20 may be provided in the rear portion of the arc shield to provide clearance for the stud holder 14.

In applications in which extremely rapid welding will be conducted, auxiliary cooling of the arc shield 13 may be necessary. This is accomplished in accordance with the present invention by means of a circular water passage 22 formed internally within the attachment 12. Cooling water is fed through this passage 22 by means of a water line 23 connected with the passage which includes both the feed and return lines therein.

In other applications, it may be found desirable to encompass the arc shield 13 in a metal protective covering on the external surface of the arc shield to further enhance the thermal conductivity between the arc shield and the attachment 12, as well as to provide the arc shield with a covering which will protect it during rough handling or usage.

Figure 3:
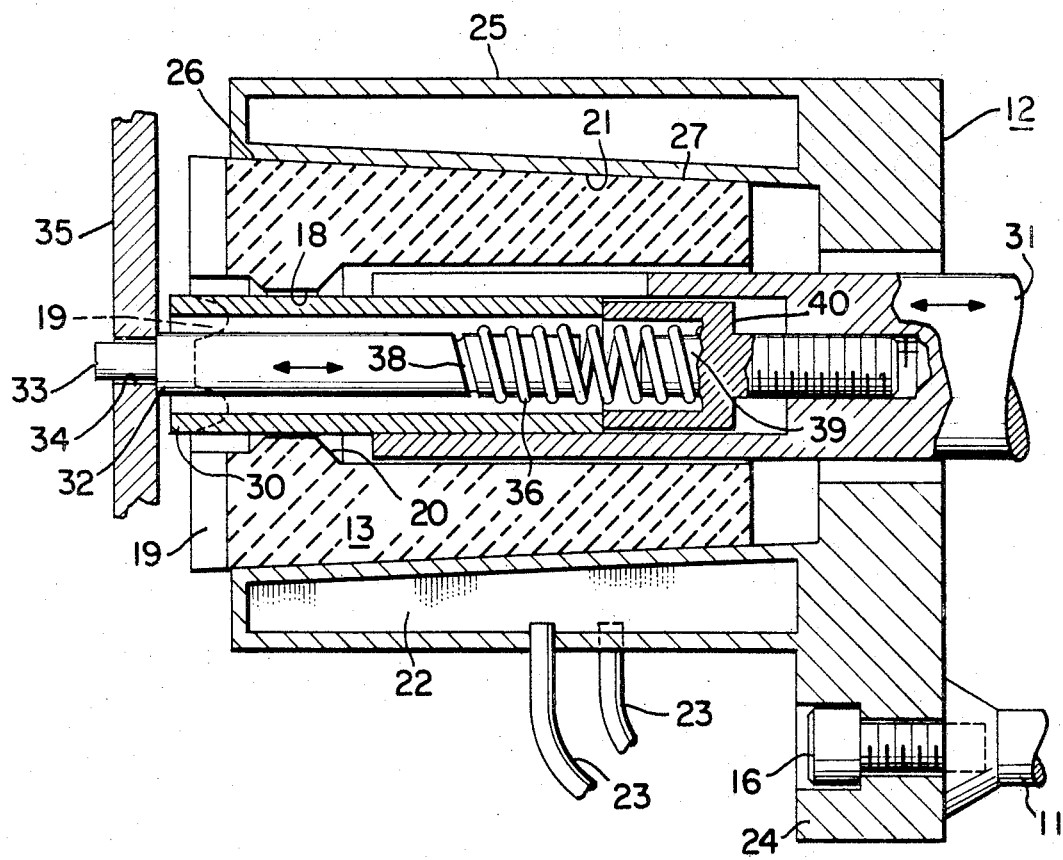
FIG. 3 is a side view, partially in section, of the internal permanent arc shield of the present invention as used in conjunction with spud welding.

The permanent arc shield 13 and its associated attachment 12 may also be used in conjunction with welding of spuds in the same manner as studs, as shown in FIG. 3, since the exterior of a spud is, for most purposes, the same as a stud.

One embodiment of the invention, as used for spud welding is shown in FIG. 3 and further includes an internal arc shield 32 which is also formed of boron nitride material. The internal arc shield is disposed within the spud 30 and is of a configuration corresponding to the interior of the spud but dimensioned slightly smaller than the spud in order that the arc shield and spud may pass over each other freely.

The spud 30 is secured to the welding gun by means of a chuck 31 and an adjustable stop 40 which are similar to those used for retaining the stud as shown in FIG. 2.

On one end of the internal arc shield 32 there is disposed a guide pin 33 which is of dimension less than that of the arc shield 32 and, likewise, smaller than the diameter of the hole 34 in the workpiece 35 to which the spud is to be welded, as will be discussed in more detail later.

The arc shield 32 is secured at its other end to the welding apparatus by means of threads 38 which thread into a spring 36. The opposite end of the spring 36 is threaded over a post 39 within the adjustable stop 40.

The intermediate part of the spring 36 is designed to extend the arc shield 32 and the guide pin 33 to a position beyond the end of the spud when the arc shield is in a free position. In this manner, the guide pin can be easily inserted into the hole over which the stud is to be welded. Upon the application of pressure on the stud welding gun in the direction of the workpiece 35, the spring 36 will compress and permit the end of the spud 30 to contact the workpiece 35 while holding the internal arc shield 32 firmly in place. Further pressure in the direction of the workpiece 35 will cause the spring loaded chuck 31 to retract to a position which brings the arc shield 13 into engagement with the workpiece. The arc shields are thus brought into place and the welding cycle may then be initiated.

The spring 36 also serves to hold the internal arc shield 32 in place when the arc shield is used in welding apparatus of the type in which the member being welded is first retracted and then plunged against the workpiece.

During the welding cycle, the molten metal will be confined to the region of the weld by the arc shield 32 which will, likewise, keep the hole 34 free of molten metal by reason of the guide pin 33 disposed therein. Due to the properties of boron nitride, as earlier discussed, the permanent arc shield 32 may be easily withdrawn from the spud after the weld cycle and, may likewise, be used for repeated welding of additional spuds.

While the internal arc shield 32 has been shown and described in conjunction with the use of the external arc shield 13, there may be circumstances under which only the internal arc shield itself will be found necessary.

In one embodiment of the present invention, an external boron nitride arc shield was used to successfully weld over one thousand welds of ⅜-inch diameter studs. The configuration of the permanent arc shield was one which had a ¾-inch outside diameter and was 1⅛ inches in length. The taper on the back portion of the arc shield was approximately 1° and 30 minutes of taper while the length of the taper was approximately one inch.

The peripheral molding chamber in the end of the external permanent arc shield was made 0.468 inches in diameter and was bored to a depth of 0.141 inches. The small bore through which the stud passes was likewise made 0.385 inches.

In another embodiment of the external arc shield of the present invention, a boron nitride arc shield was used to weld 10,000 ¼-inch diameter studs.

The foregoing description of the permanent arc shields and arc shield attachments of the present invention has been of specific embodiments thereof and it is to be understood that this description is only for the purpose of illustration and the invention is not thereby intended to be limited, but includes all modifications and embodiments which fall within the scope of the appended claims.

We claim:

1. A permanent arc shield combination for use in attaching a hollow welding stud to a workpiece comprising:

A first member of refractory material having a bore therethrough. One portion of said bore having a cross section only enough larger than the stud to permit the stud to pass freely therethrough. The bore at one end thereof being slightly enlarged to provide a narrow exterior peripheral molding chamber around the end of the stud; and A second member formed of refractory material having a configuration corresponding to the interior of the hollow welding stud but dimensioned to pass freely therethrough to provide an internal molding chamber within the hollow member.

2. In combination for welding the end of a hollow welding stud to a workpiece and for confining the molten metal and welding flash to the proximity of the weld comprising:

a stud welding gun;

a first arc shield having a narrow peripheral exterior molding chamber adapted to be disposed in shielding relationship to the workpiece of the welding end of said hollow stud;

a second arc shield having a configuration corresponding to the interior of the hollow stud but dimensioned to pass freely therethrough, said second arc shield providing an interior molding chamber within said hollow stud during welding thereof; and means associated with said welding gun for securing said first and second arc shield to said welding gun for withdrawal from shielding relationship with said hollow stud following the welding operation.

3. In the art of stud welding including a stud welding gun, a stud carried by the welding gun for welding to a workpiece by the stud end welding technique and an arc shield surrounding the juncture of the stud and workpiece for confining the resultant molten metal and forming a weld base fillet, the improvements in said arc shield comprising:

an elongate arc shield of refractory material having a bore therethrough, one portion of said bore having a cross section only enough larger than the stud to permit the stud to pass free therethrough, the bore at one end of the member being slightly enlarged to provide a narrow peripheral molding chamber around the welding end of the arc shield; and a cooling jacket in contact with and surrounding said arc shield for force cooling the arc shield.

4. The improved arc shield of claim 3 in which said cooling jacket includes internal passages therein for circulation of a liquid cooling fluid.

5. The improved arc shield of claim 3 wherein the cooling jacket is supported by the welding gun and the arc shield is carried by the cooling jacket.

6. The arc shield of claim 5 wherein both the external surface of the arc shield and the internal surface of the cooling jacket have a corresponding taper throughout the extent of their contact to provide mating heat transfer relationship and positive securement of the arc shield within the cooling jacket.